United States Patent
Denton, III

Patent Number: 5,962,168
Date of Patent: Oct. 5, 1999

[54] POLYMER ELECTROLYTE SOLVENT FOR ELECTROCHEMICAL CELL

[75] Inventor: Frank R. Denton, III, Lawrenceville, Ga.

[73] Assignee: Motorola, Inc., Schaumburg, Ill.

[21] Appl. No.: 09/066,656

[22] Filed: Apr. 27, 1998

Related U.S. Application Data

[63] Continuation-in-part of application No. 08/781,255, Jan. 10, 1997.

[51] Int. Cl.$^6$ .................................................. H01M 10/40
[52] U.S. Cl. ........................ 429/303; 429/199; 429/200; 252/62.2
[58] Field of Search ................... 429/303, 199, 429/200; 252/62.2

[56] References Cited

U.S. PATENT DOCUMENTS

| | | | |
|---|---|---|---|
| 2,635,093 | 4/1953 | Miller et al. . | |
| 4,361,678 | 11/1982 | Tatemoto et al. | 528/374 |
| 5,296,318 | 3/1994 | Gozdz et al. | 429/192 |
| 5,444,140 | 8/1995 | Paine et al. | 526/346 |
| 5,582,623 | 12/1996 | Chu | 29/623.1 |
| 5,637,421 | 6/1997 | Poehler et al. | 429/190 |
| 5,639,573 | 6/1997 | Oliver et al. | 429/190 |
| 5,900,183 | 5/1999 | Kronfli et al. | 252/62.2 |

OTHER PUBLICATIONS

Cameron, et al, Liquid Polymer Electrolytes, Polymer Electrolyte Reviews, Ch. 5, pp. 157–190, 1989 (no month).
F.M. Gray, Mixed Polymer Systems, Polymer Electrolyte Reviews, Ch. 6, pp. 139–172, 1987 (no month).
F.M. Gray, Solid Polymer Electrolytes, Fundamentals and Technological Applications, VCH Pub., New York, 1991, pp. 95–97, 107–111 (no month).
Tsuchida, et, Conduction of Lithium Ions in Polyvinylidene Fluoride and Its Derivatives Electrochima Acta, vol. 28 no month 1983.
Billmeyer, Textbook of Polymer Science—2nd Edition; 1962 pp. 5–6 (no month).

*Primary Examiner*—Maria Nuzzolillo
*Assistant Examiner*—Carol Chaney
*Attorney, Agent, or Firm*—Felipe J. Farley

[57] ABSTRACT

An electrochemical cell (10) includes first and second electrodes (12) and (14) with an electrolyte system (26) disposed therebetween. The electrolyte system includes a polymeric support structure through which is dispersed an electrolyte active species in a solvent. The solvent comprises a poly (vinylidene fluoride) having a number average molecular weight of less than about 50,000 atomic mass units. Alternatively, the solvent may be a blend or copolymer of polyvinylidene fluoride and another solvent or polymer.

27 Claims, 1 Drawing Sheet

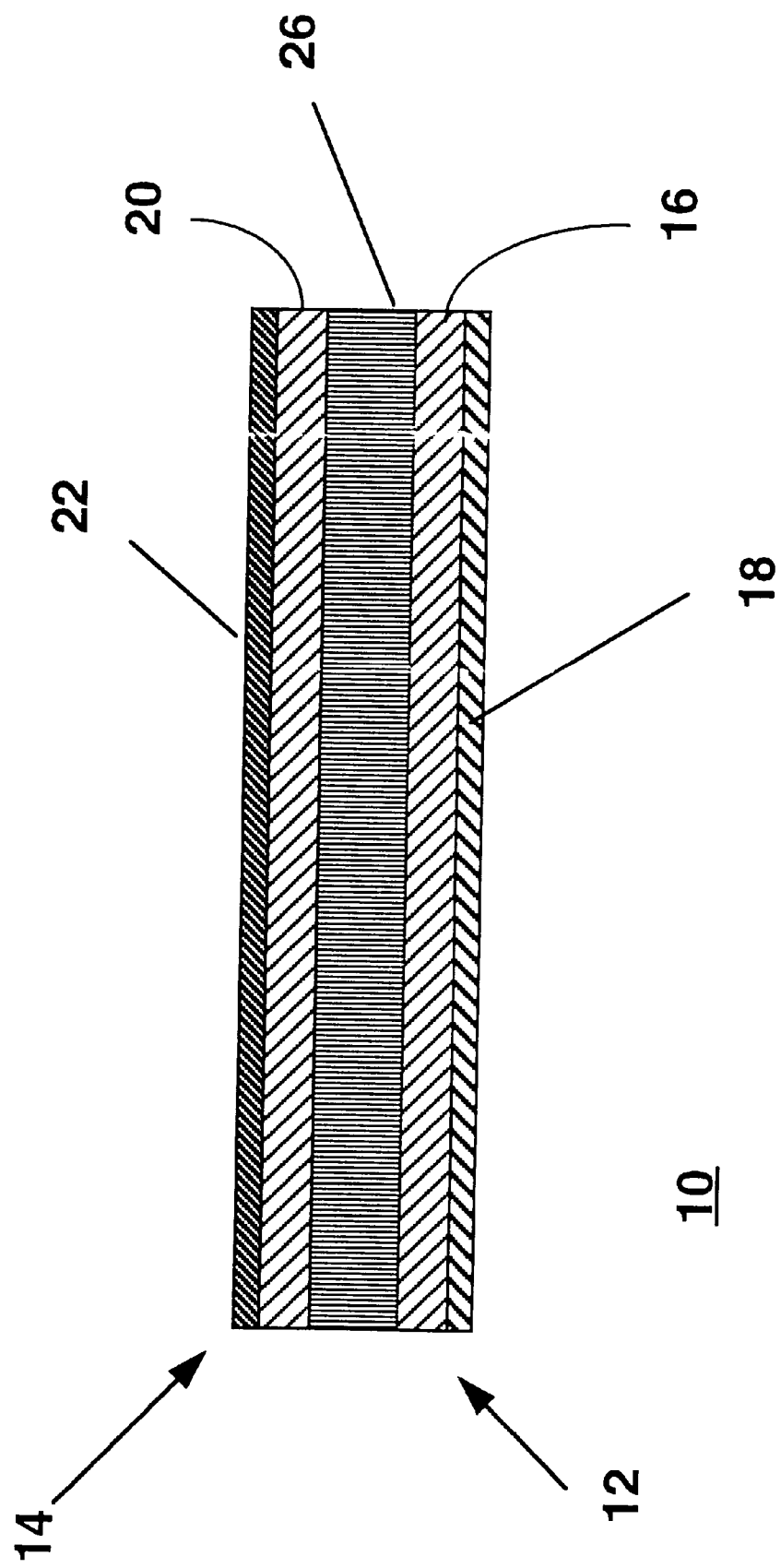

POLYMER ELECTROLYTE SOLVENT FOR ELECTROCHEMICAL CELL

CROSS REFERENCE TO RELATED APPLICATIONS

This application is a continuation-in-part application of pending U.S. application Ser. No. 08/781,255, filed Jan. 10, 1997, by Denton, Frank R., III, entitled "Polymer Electrolyte Solvent for Electrochemical Cell,", and assigned to Motorola, Inc.

TECHNICAL FIELD

This invention relates in general to electrochemical cells, and in particular to rechargeable electrochemical cells which use solvents in the electrolytes thereof.

BACKGROUND OF THE INVENTION

There has been a great deal of interest in developing better and more efficient methods for storing energy for applications such as cellular communication, satellites, portable computers, and electric vehicles to name but a few. Accordingly, there have been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivity tend to leak out of the cells into which they are sealed. While better manufacturing techniques have lessened the occurrence of leakage, cells still do leak potentially dangerous liquid electrolytes from time to time. Moreover, any leakage in the cell lessens the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitude poorer than a liquid electrolyte. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. Today, most electrochemical cells based on a lithium-ion chemistry employ at least some graphite in the anode of the cell. In such cells, graphite rapidly loses much of its capacity in the presence of the best high boiling point, low melting point electrolyte solvents, examples of which include propylene carbonate (PC). Since low melting point solvents are needed to obtain low-temperature performance, a trade-off is made by incorporating a significant amount of low-melting, low-boiling point solvent instead of PC. Unfortunately, many of these alternative solvents are flammable and/or combustible.

Accordingly, there exists a need for a new electrolyte system which combines the properties of high ionic conductivity and excellent low temperature performance, all while using a non-volatile solvent or plasticizer. The electrolyte should not compromise performance at higher temperatures, should be relatively cost effective, and should be easy to produce.

BRIEF DESCRIPTION OF THE DRAWINGS

FIG. 1 is a cross sectional side view of an electrochemical cell in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of a gel electrolyte bonded electrochemical cell in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium, lithium alloys, such as lithium: aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. patent application Ser. No. 08/561,641 entitled "Improved Carbon Electrode Materials For Lithium Battery Cells And Method of Making Same" filed on Nov. 22, 1995, in the names of Jinshan Zhang, et al., the disclosure of which is incorporated herein by reference.

More particularly, the anode 12 comprises a layer of active material 16 such as a carbon material as described hereinabove deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper.

The second electrode 14 may be adapted to be the cathode of a lithium rechargeable cell. In such an instance, the cathode is fabricated of a lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, co-pending U.S. patent application Ser. No. 08/464,440 in the name of Zhenhua Mao filed Jun. 5, 1995, the disclosure of which is incorporated herein by reference.

More particularly, the cathode 14 comprises a layer of the cathode active material 20 disposed on a cathode substrate 22. The cathode material 20 maybe such as that described hereinabove, while the substrate may be fabricated from any of a number of known materials known in the art, examples of which include aluminum, nickel, and combinations thereof. In one preferred embodiment, cathode substrate 22 is fabricated of aluminum. Disposed between electrodes 12 and 14 is a layer of an electrolyte system 26. The electrolyte system 26 comprises an electrolyte active species dispersed in a polymer gel electrolyte support structure. The polymer gel support structure may consist of one or more different polymers.

The polymer from which the polymeric support structure is fabricated may be selected from the group consisting of polyethylene, polypropylene, polytetrafluroethylene, polyethyleneterephthalate, polystyrene, ethylene propylene diene monomer, nylon, polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. Alternatively, the polymeric support structure may be fabricated of a multilayered structure of the foregoing polymers, such as is disclosed in commonly assigned, co-pending patent application Ser. No. 08/739,229, filed Oct. 28, 1996, in the names of Venugopal, et al, the disclosure of which is incorporated herein by reference.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in an organic solvent. Typical alkali metal salts include, but are not limited to, salts having the formula $M^+X^-$ where M+ is an alkali metal cation such as Li+, Na+, K+, and combinations thereof; and X– is an anion such as. Cl–, Br–, I–, ClO4–, BF4–, PF6–, ASF6–, SbF6–, CH3CO2–, CF3SO3–, N(CF3SO2)2–, C(CF3SO2)3–, and combinations thereof.

The organic solvent comprises at least a low number average molecular weight poly(vinylidene fluoride) (low-PVDF). Low molecular weight PVDF or low-PVDF is defined herein as PVDF having a number average molecular weight of not greater than about 50,000 atomic mass units (a.m.u.'s), and most preferably a number average molecular weight of less than about 2,000 a.m.u.'s. PVDF having number average molecular weights in the recited range are substantially liquid, but may be, at molecular weights closer to 50,000 a.m.u.'s, syrupy, paste-like, or waxy.

Low-PVDF has many advantages as an electrolyte solvent of an electrochemical cell. It's thermodynamic stability (e.g., electrochemical stability) is independent of number average molecular weight. Low-PVDF is more miscible with other liquids than is high number average molecular weight PVDF. Low-PVDF can accommodate high concentrations of Li salt while allowing high Li ion diffusion rates, an important criteria for use in Li batteries. Low-PVDF will have good solvent-like miscibility and compatibility with high number average molecular weight PVDF (high-PVDF, i.e., PVDF with number average molecular weights of between about 200,000 and 700,000 a.m.u.'s). This is important since many lithium batteries now use high-PVDF, which is substantially a solid, as a binder in the electrodes of such cells. Finally, low-PVDF melts well below room temperature, is not viscous, and is not volatile. Low-PVDF is a flame retardant which renders it a good choice for an electrolyte solvent, whether used alone or in combination with other solvents.

In an alternative embodiment of the invention, the electrolyte solvent may be a polymer blend comprising low-PVDF and one or more solvents selected from the group consisting of diethyl carbonate, propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof. In a preferred embodiment, the organic solvent comprises at least 10% by volume low-PVDF with the balance being one or more of the above-mentioned solvents.

One preferred solvent is one which is a binary system comprising low-PVDF and ethylene carbonate. In this embodiment, low-PVDF comprises at least about 10% by volume of the solvent, and preferably about 50% by volume of the solvent.

In another preferred embodiment, said organic solvent is a ternary system comprising at least low-PVDF and ethylene carbonate and one additional solvent selected from the group consisting of diethyl carbonate, acetonitrile, propylene carbonate, dimethyl carbonate, dipropylcarbonate, dimethylsulfoxide, acetonitrile, dimethoxyethane, tetrahydrofuran, n-methyl-2-pyrrolidone, and combinations thereof.

In another alternative embodiment, the electrolyte solvent may be either a polymer blend or a co-polymer of low-PVDF and one or more other low molecular weight polymers selected from the group of polyacrylonitrile, poly(vinyl chloride), polyacrylics, polyesters, polyacetates, poly(tetrahydrofuran), polyitaconates, poly(vinyl pyridine), poly(vinyl pyrrolidones), polyphosphazenes, polysiloxanes, poly(vinylene carbonate), poly(acrylamides), poly(vinyl alcohol), poly(ethylene imine), poly (vinyl acetate), poly ethylene oxide, and combinations thereof.

One preferred solvent is one which is a low number average molecular weight copolymer comprising a PVDF derivative, i.e., vinylidene fluoride and, for example, at least one of hexafluoropropene and tetrafluoroethene structural units. In this embodiment, low-PVDF comprises at least about 10% by volume of the solvent, and preferably about 50% by volume of the solvent.

In another preferred embodiment, said solvent is a polymer blend comprising at least low-PVDF and low number average molecular weight poly vinyl acetate, and one additional solvent selected from the group consisting of ethylene carbonate, diethyl carbonate, acetonitrile, propylene carbonate, dimethyl carbonate, dipropylcarbonate, dimethylsulfoxide, acetonitrile, dimethoxyethane, tetrahydrofuran, n-methyl-2-pyrrolidone, and combinations thereof.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte system for a rechargeable electrochemical cell comprising a polymeric support structure for supporting an electrolyte active species dispersed therein, said electrolyte active species comprises an electrolyte salt dispersed in a solvent, wherein said solvent comprises poly(vinylidene fluoride) having a number average molecular weight of not greater than 50,000 atomic mass units.

2. An electrolyte system as in claim 1, wherein said poly(vinylidene fluoride) has a number average molecular weight of less than 2,000 atomic mass units.

3. An electrolyte system as in claim 1, wherein said electrolyte salt comprises an alkali metal salt having the formula $M^+X^-$, where $M^+$ is an alkali metal cation and where $X^-$ is an anion selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_3^-$, and combinations thereof.

4. An electrolyte systems as in claim 1, wherein said solvent comprises poly(vinylidene fluoride) and one or more solvents selected from the group consisting of diethyl carbonate, propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof.

5. An electrolyte system as in claim 4, wherein the solvent comprises at least 10% by volume poly(vinylidene fluoride).

6. An electrolyte system as in claim 1, wherein said comprises poly(vinylidene fluoride) or its derivatives and one or more other polymers selected from the group of polyacrylonitrile, poly(vinyl chloride), polyacrylics, polyesters, polyacetates, poly(tetrahydrofuran), polyitaconates, poly(vinyl pyridine), poly(vinyl pyrrolidones), polyphosphazenes, polysiloxanes, poly(vinylene carbonate), poly(acrylamides), poly(vinyl alcohol), poly(ethylene imine), poly(vinyl acetate), polyethylene oxide, and combinations thereof.

7. An electrolyte system as in claim 6, wherein said solvent is a copolymer comprising vinylidene fluoride and at least one of hexafluoro propene and tetrafluorethene.

8. An electrolyte system as in claim 7, wherein poly(vinylidene fluoride) comprises at least about 10% by volume of the copolymer solvent.

9. An electrolyte for an electrochemical cell, said electrolyte comprising an electrolyte salt dispersed in a solvent, wherein said solvent comprises, by volume, at least 10% poly(vinylidene fluoride) having a number average molecular weight of not greater than 50,000 atomic mass units.

10. An electrolyte as in claim 9, wherein said poly(vinylidene fluoride) has a number average molecular weight of less than 50,000 atomic mass units.

11. An electrolyte as in claim 9, wherein said poly(vinylidene fluoride) has a number average molecular weight of less than 2,000 atomic mass units.

12. An electrolyte as in claim 9, wherein said electrolyte salt comprises an alkali metal salt having the formula $M^+X^-$, where $M^+$ is an alkali metal cation and where $X^-$ is an anion selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_3^-$ and combinations thereof.

13. An electrolyte as in claim 9, wherein said solvent comprises poly(vinylidene fluoride) and one or more solvents selected from the group consisting of diethyl carbonate, propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof.

14. An electrolyte as in claim 13, wherein the solvent comprises at least 10% by volume poly(vinylidene fluoride).

15. An electrolyte as in claim 9, wherein said comprises poly(vinylidene fluoride) or its derivatives and one or more other polymers selected from the group of polyacrylonitrile, poly(vinyl chloride), polyacrylics, polyesters, polyacetates, poly(tetrahydrofuran), polyitaconates, poly(vinyl pyridine), poly(vinyl pyrrolidones), polyphosphazenes, polysiloxanes, poly(vinylene carbonate), poly(acrylamides), poly(vinyl alcohol), poly(ethylene imine), poly(vinyl acetate), polyethylene oxide, and combinations thereof.

16. An electrolyte as in claim 15, wherein said solvent is a copolymer comprising vinylidene fluoride and at least one of hexafluoro propene and tetrafluorethene.

17. An electrolyte as in claim 16, wherein poly(vinylidene fluoride) comprises at least about 10% by volume of the copolymer solvent.

18. An electrochemical cell comprising:

an anode;

a cathode; and an electrolyte comprising an electrolyte salt dispersed in a solvent, wherein said solvent comprises poly(vinylidene fluoride) having a number average molecular weight of not greater than 50,000 atomic mass units.

19. An electrochemical cell as in claim 18, wherein said anode is a lithium containing carbon.

20. An electrochemical cell as in claim 18, wherein said cathode is a lithiated metal oxide.

21. An electrochemical cell as in claim 18, wherein said electrolyte salt comprises an alkali metal salt having the formula $M^+X^-$, where $M^+$ is an alkali metal cation and where $X^-$ is an anion selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_3^-$, and combinations thereof.

22. An electrochemical cell as in claim 18, wherein said poly(vinylidene fluoride) has a number average molecular weight of less than 2,000 atomic mass units.

23. An electrochemical cell as in claim 18, wherein said solvent comprises poly(vinylidene fluoride) and one or more solvents selected from the group consisting of diethyl carbonate, propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof.

24. An electrochemical cell as in claim 25, wherein the solvent comprises at least 10% by volume poly(vinylidene fluoride).

25. An electrochemical cell as in claim 18, wherein said comprises poly(vinylidene fluoride) and one or more other polymers selected from the group of polyacrylonitrile, poly(vinyl chloride), polyacrylics, polyesters, polyacetates, poly(tetrahydrofuran), polyitaconates, poly(vinyl pyridine), poly(vinyl pyrrolidones), polyphosphazenes, polysiloxanes, poly(vinylene carbonate), poly(acrylamides), poly(vinyl alcohol), poly(ethylene imine), poly(vinyl acetate), polyethylene oxide, and combinations thereof.

26. An electrochemical cell as in claim 25, wherein said solvent is a copolymer comprising vinylidene fluoride and at least one of hexafluoro propene and tetrafluorethene.

27. An electrochemical cell as in claim 25, wherein poly(vinylidene fluoride) comprises at least about 10% of the copolymer solvent by volume.

* * * * *